United States Patent Office 3,524,654
Patented Aug. 18, 1970

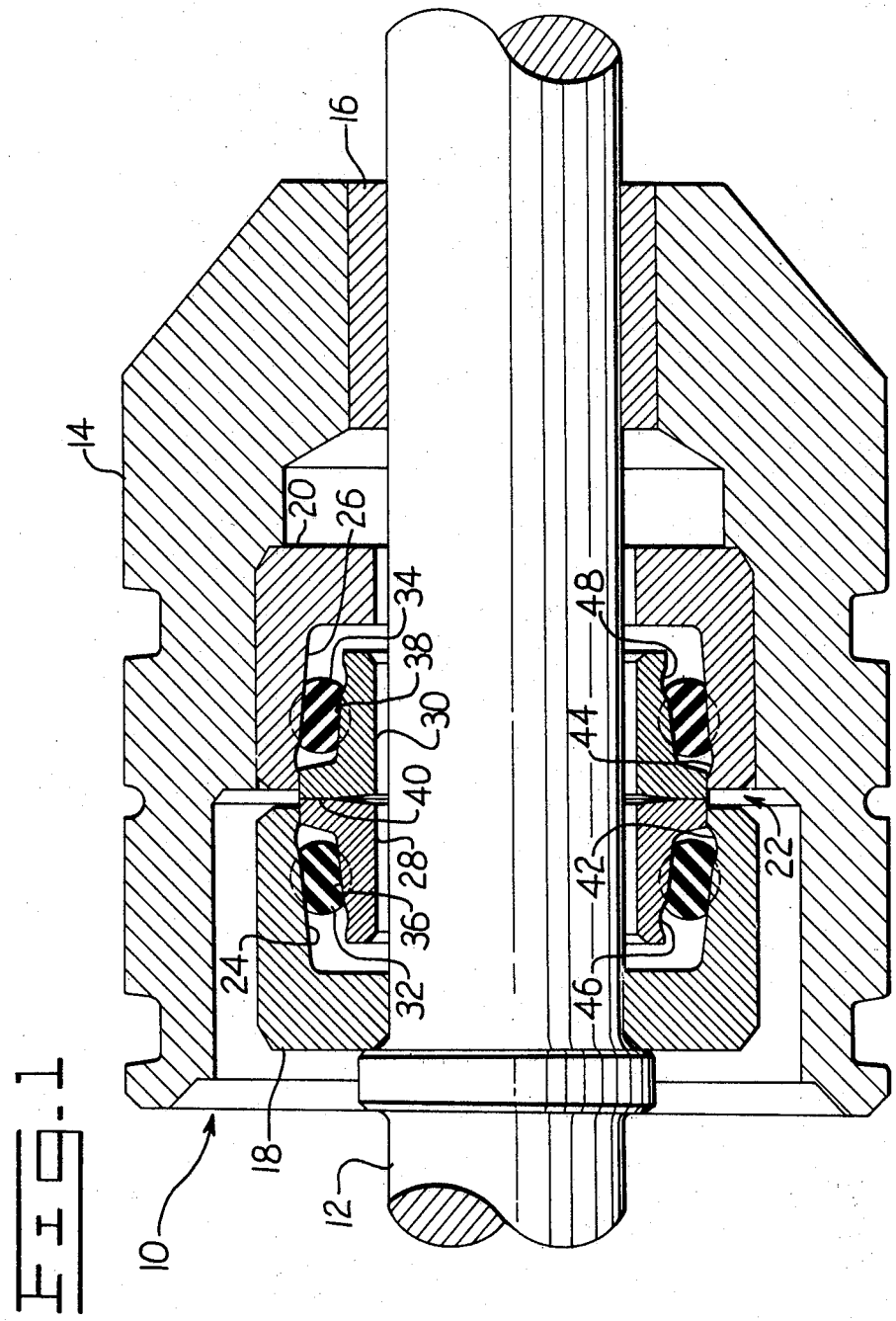

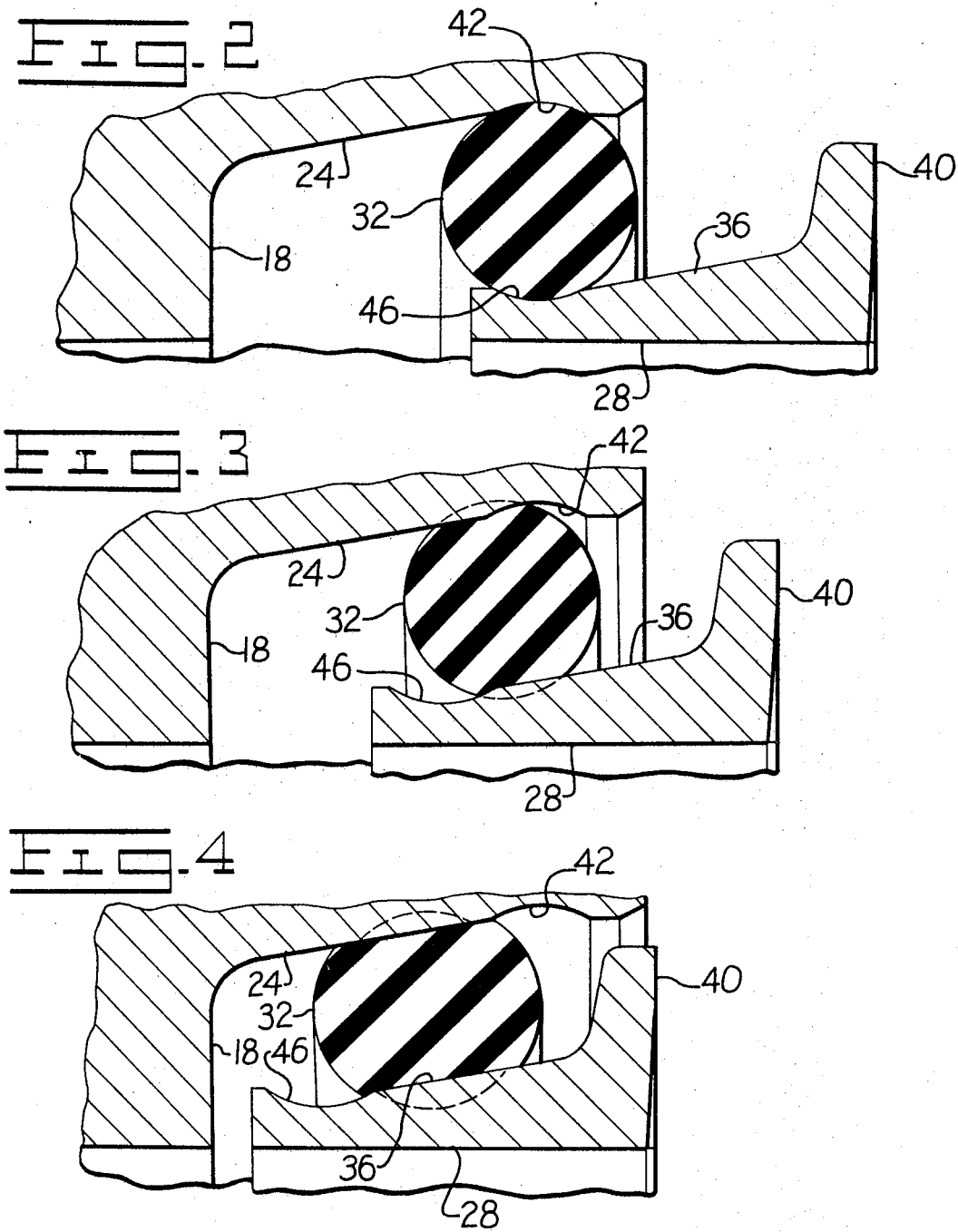

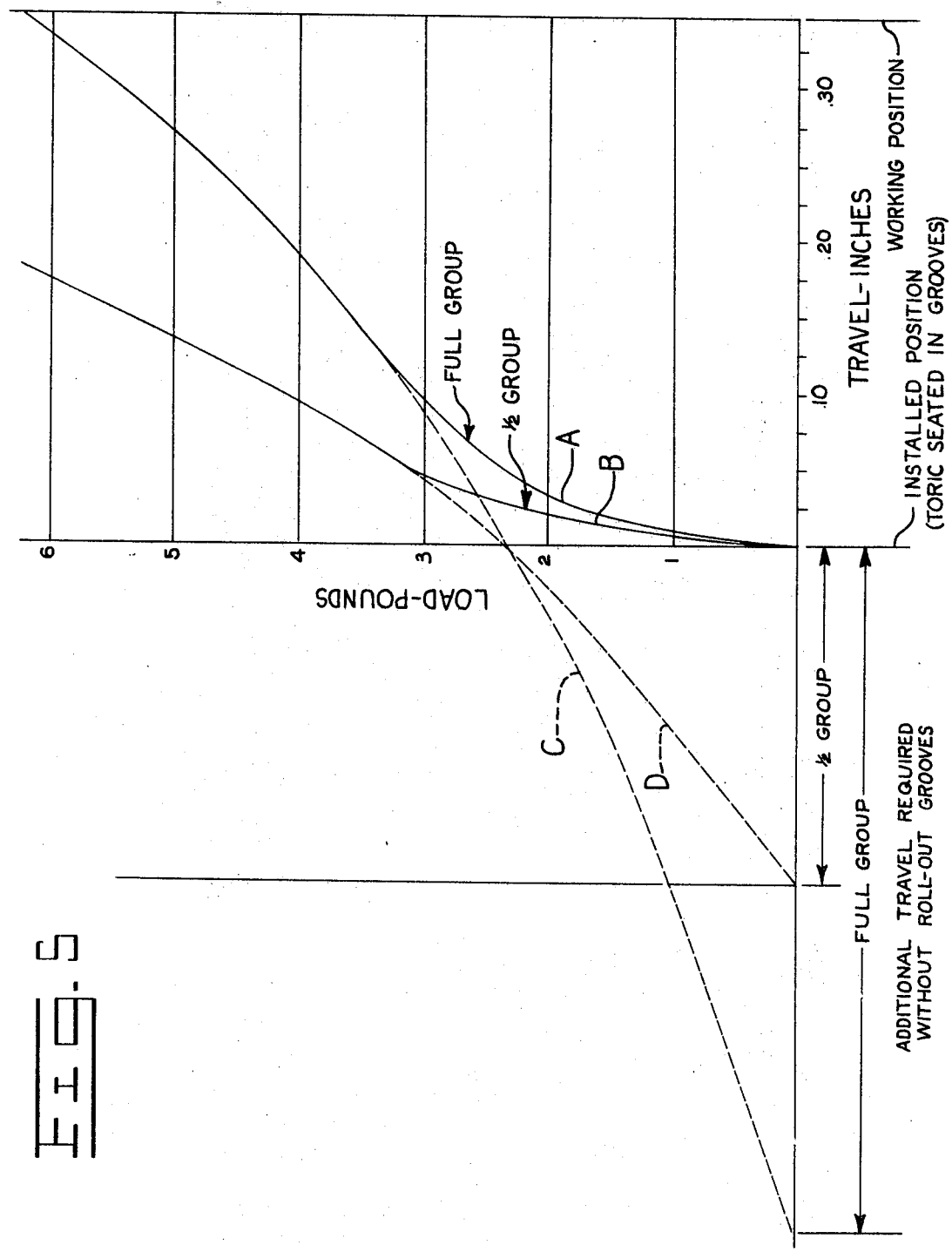

3,524,654
FACE SEAL ASSEMBLY
Roland E. Hasselbacher, Brimfield, and Edwin J. Eckert, Peoria, Ill., assignors to Caterpillar Tractor Co., Peoria, Ill., a corporation of California
Filed Feb. 26, 1968, Ser. No. 708,094
Int. Cl. F16j 15/34
U.S. Cl. 277—92                                      4 Claims

ABSTRACT OF THE DISCLOSURE

Roll-out grooves are provided in the confronting load surfaces of a retainer and seal ring of a face seal assembly to be in axial alignment prior to assembly of the seal and receive an O-ring. As the retainer and seal ring are axially assembled the O-ring rolls out of the grooves and between the confronting load surfaces to achieve suitable radial squeeze upon the O-ring and an optimum working face load for the seal assembly with minimum axial displacement of the O-ring and seal components.

BACKGROUND OF THE INVENTION

In a conventional type of metal-to-metal face seal, a resilient O-ring is placed between slightly converging, tapered load surfaces of a retainers cone and a seal ring. Upon assembly, the O-ring is gradually rolled to its operating position during extended relative axial movement of the retainer cone and the seal ring. The extended axial movement is generally undesirable for a compact seal assembly. Because of the extended axial movement required to reach the normal load range, the preferred load conditions for optimum operation of such a prior art seal exist during a relatively shorter portion of the load curve.

SUMMARY OF THE INVENTION

The invention provides a seal assembly with recesses in the load surfaces of its retainer member and associated seal ring. The recesses are in axial alignment during initial assembly of the seal to receive a resilient toric. Upon continued axial assembly of the seal components, the toric is simultaneously rolled out of both recesses and onto the load surfaces. This causes a sharp rise of the load deflection curve of the toric. Thus, a desirable face load is obtained with relatively limited axial motion during assembly of the seal.

The load surfaces may thus be configured to maintain a desired face load during seal operation substantially free from consideration of proper assembly loading of the toric. This is particularly desirable where the seal configuration is to accommodate axial motion in operation with a minimum amount of variation in the face load, or to accommodate a large build up of tolerances due to manufacturing or design during initial assembly.

Additional advantages of the present invention are made apparent in the following description having reference to the accompanying drawings.

In the drawings:

FIG. 1 is a cross-section view of a metal-to-metal face seal configuration modified in accordance with the invention;

FIGS. 2, 3 and 4 are similar fragmentary views of the face seal configuration of FIG. 1 showing, in sequence, the assembly of an O-ring between the loading surfaces of a seal ring and retainer; and FIG. 5 is a graph showing a comparison of the load curves developed with and without the roll-out grooves of the present invention.

DESCRIPTION OF THE PREFERRED EMBODIMENT

A face-to-face metal seal assembly is illustrated in FIG. 1 to provide suitable sealing between a shaft 12 and a support member 14. The shaft is rotatably supported within the member 14 by bearing means 16. The seal assembly comprises a rotating retainer 18 secured by press fit or other means to the shaft 12 and a stationary retainer 20 similarly secured within the member 14. The retainers 18 and 20, upon assembly, are spaced apart to define a selected gap 22. Loading surfaces 24 and 26 on the retainers 18 and 20, respectively, are gradually tapered, for example, on the order of 6°. A pair of seal rings 28 and 30 are supported in suitable radial positions within the retainers 18 and 20, respectively, by means of resilient torics or O-rings 32 and 34. The seal rings 28 and 30 are provided with loading surfaces 36 and 38, respectively, which are gradually tapered, preferably but not necessarily at the same angle as the retainer loading surfaces 24 and 26. A rotatable seal surface 40 is defined between confronting faces of the seal rings 28 and 30. A load force is generated at the seal surface 40 via the confronting conical loading surfaces 24, 36 and 26, 38 by the O-rings 32 and 34, respectively. The O-rings are selectively inverted to an unstable state during the assembly of the seal configuration 10 as further described infra.

In accordance with the invention, the retainers 18 and 20 have concentric, radial grooves 42 and 44 formed at the leading edges of their loading surfaces 24 and 26. The conical loading surfaces 36 and 38 of the seal rings 28 and 30 are similarly provided with radial grooves 46 and 48, respectively. The grooves 42, 44, 46 and 48 have cross-sections of similar radii which are in turn equal to the cross-section radii of the O-rings 32 and 34 prior to their assembly in the seal configuration.

Referring now to FIGS. 2–4, the cross sections of the retainer 18, seal ring 28 and O-ring 32 are shown in greater detail in various stages of assembly of the seal configuration 10. In FIG. 2, the O-ring 32 is shown as initially disposed in the confronting grooves 42 and 46. Assembly is simplified since the O-ring is first slipped into the groove 46 of the seal ring 28 where it is held while the seal ring 28 is slipped within the retainer 18 to the position shown in FIG. 2.

Initial axial movement of the seal ring 28 within the retainer 18, to a position as in FIG. 3, immediately provides a partial roll-out of the O-ring 32 causing immediate substantial squeeze of the O-ring cross-section and providing a rapid rise in the load curve such as shown in FIG. 5.

In FIG. 4, the O-ring 32 is shown in its operating position between the assembled retainer 18 and seal ring 28 and more particularly between their confronting, equally tapered, loading surfaces 24 and 36.

Predicted load vs. travel curves are shown in FIG. 5 for a face seal configuration such as that shown in FIG. 1, employing 6° ramps in the retainers and seal rings, with 32% compression of the O-ring at its working position. As the seal ring 28 is displaced axially toward the retainer 18, the O-ring 32 is forced to roll out of the confining grooves 42 and 46 simultaneously resulting in the sharp rise of the load deflection curve as shown by full and half (½) group curves A and B of FIG. 5. Beyond the working position, the slope of the load deflection curve is primarily the function of the angle of the ramps or load surfaces 24, 26, 36, 38 with respect to the center line of rotation of the O-ring. Thus, the angle of the load surfaces may be selected for the particular application and the working conditions of the face seal configuration.

Curves C and D, in dashed lines on FIG. 5, depict the deflection curves for a similar face seal configuration but without the roll-out grooves of the present invention. A substantially greater amount of axial displacement of the seal ring relative to the retainer is required to achieve the same degree of squeeze of the toric cross section and thus an equal degree of loading force on the seal rings.

The concepts of the present invention may be applied to various types of face seal configurations particularly those having equal opposing loading surfaces in order to provide, for example, the following advantages. Assembly of the O-ring and seal ring into the retainer is simplified and permitted with less space regardless of the desired final assembled face loads. The O-ring position with respect to the seal ring and retainer is more constantly predictable especially in cases where there is a pressure differential across the seal faces and/or O-ring. The amount of radial squeeze on the O-ring is freely predeterminable and rapidly applied to counteract its tendency to slide because of the aforementioned pressure differential and to compensate for variations from the desired face load because of this same pressure. A relatively greater portion of the load deflection curve is usable to withstand variations in the seal operating conditions because of the rapid loading. Predictability of the slope of the load deflection curve after rolling out of the grooves is also enhanced.

We claim:

1. In a rotatable face seal assembly having a resilient toric disposed between confronting inclined loading surfaces of a pair of members, said members being operatively coupled to rotatable seal ring means to provide an axial force for effecting a rotatable seal, the improvement comprising, each of the confronting loading surfaces being circumferentially recessed for initially receiving the toric, each of the recesses forming an initial roll-out surface which is of substantially greater inclination than the respective loading surface for causing a sharp load deflection rise in the toric during initial relative axial motion of the members.

2. The face seal configuration of claim 1 wherein each of the recesses is a radial groove formed within the confronting circumferences of the load surfaces, said grooves having radii substantially equal to the radius of the toric.

3. The face seal configuration of claim 2 wherein the radial grooves are in register to receive the toric therebetween during initial assembly of the members so that subsequent axial movement of the members relative to each other causes the toric to roll simultaneously from both grooves onto the load surfaces of the members.

4. The face seal configuration of claim 3 wherein the load surfaces are configured for optimum loading during operation of the seal.

References Cited

UNITED STATES PATENTS 3,004,807   10/1961   Kniepkamp.
3,086,782    4/1961   Peickii et al. _____ 277—92

LAVERNE D. GEIGER, Primary Examiner

J. S. MEDNICK, Assistant Examiner

U.S. Cl. X.R.

277—38, 96, 168